United States Patent [19]

Mihara et al.

[11] 4,371,775
[45] Feb. 1, 1983

[54] METHOD AND APPARATUS FOR PLASMA WELDING

[75] Inventors: Takao Mihara, Matsubara; Toshiaki Morichika, Hirakata; Shigenori Sone, Nara, all of Japan

[73] Assignee: Kubota, Ltd., Osaka, Japan

[21] Appl. No.: 251,058

[22] Filed: Apr. 6, 1981

[30] Foreign Application Priority Data

Apr. 23, 1980 [JP] Japan .................................. 55-54802

[51] Int. Cl.³ .............................................. B23K 9/10
[52] U.S. Cl. ............................ 219/121 PK; 219/121 PJ; 219/121 PN; 219/121 PT; 219/137 R; 219/61; 219/61.7; 219/60 A
[58] Field of Search ........ 219/121 P, 121 PY, 121 PJ, 219/121 PK, 121 PN, 121 PM, 74, 75, 137 R, 76.16, 61, 60 A, 59.1, 61.7, 76.11

[56] References Cited

U.S. PATENT DOCUMENTS

| | | |
|---|---|---|
| 4,032,744 | 6/1977 | Coucher ...................... 219/121 PM |
| 4,125,754 | 11/1978 | Wasserman et al. ......... 219/121 PN |
| 4,195,216 | 3/1980 | Beauchamp et al. ......... 219/121 PT |

*Primary Examiner*—M. H. Paschall
*Attorney, Agent, or Firm*—Armstrong, Nikaido, Marmelstein & Kubovcik

[57] ABSTRACT

The invention relates to a method and an apparatus to perform plasma welding, by providing a cooling water temperature detector at the inlet side of cooling water in the plasma welding torch, controlling the temperature at the inlet side of the cooling water running into the plasma welding torch at a set temperature of more than 4° C. and less than 18° C., starting a plasma arc when the temperature of the cooling water reaches a specified point after starting to pass the cooling water, and moving the base metals and the torch relatively upon lapse of a specified time allowed to form a keyhole after start of the plasma arc.

4 Claims, 3 Drawing Figures

METHOD AND APPARATUS FOR PLASMA WELDING

BACKGROUND OF THE INVENTION

Present invention relates to a method of performing butt welding of base metals by plasma keyhole welding and apparatus to be used in the performance of said method.

Plasma keyhole welding is widely used in welding of thick wall plate materials, however applications of this method in welding of thick wall tube materials involve difficult technical problems, and are not used partically.

The reason is that treatment of the crater formed at the end point of plasma keyhole welding differs between plate materials and tube materials. If the base metals are plates, the welding end part including the crater may be cut off together after welding. In the case of tube materials, however, the weld line circles around the tube, and the welding end point overlaps with the welding start point, so that the crater can not be cut off.

The applicant had studied to butt-weld tube materials by plasma keyhole welding, and already obtained sucessful results.

The applicant disclosed the crater treatment method at the welding end point in the Japanese Published Examined Patent Application No. SHO. 52-15379, Published Unexamined Patent Application No. SHO. 50-2646, and Published Examined Patent Application No. SHO. 52-9532. Also the applicant disclosed method of forming keyhole upon start of welding in the Published Unexamined Patent Application No. SHO-51-32445 and Published Unexamined Utility Model Application No. SHO-54-152229. In addition, the applicant disclosed the configuration of plasma welding torch with respect to tube base metals in the Published Unexamined Patent Application No. SHO-52-120247.

Plasma keyhole welding should be performed with due considerations given to various forces, such as gravity acting on the deposited metal, surface tension, plasma gas pressure and back gas pressure, and the balance among the flow of shielding gas, welding current, welding speed and cooling water temperature.

Yet, in order to solve problem of blowhole being formed in the welding start area, it is essential to complete a keyhole by stopping progress of welding for a specified time after start of plasma arc, and the proceed welding.

If stationary time $T_1$ after start of plasma arc until the tube base metal starts to rotate is too short, welding proceeds while keyhole formation is insufficient, and a blowhole is left in the start position. To the contrary, if stationary time $T_1$ is too long, the keyhole grows excessively to cause melt-down bead. Hence, it is important to keep stationary time $T_1$ at a proper duration. To obtain optimum bead by keeping constant stationary time $T_1$ it is, however, essential that the plasma gas temperature is maintained at a specified high point. Nevertheless, since the plasma arc is cooled from its circumference by cooling water within the welding torch and is concentrated to attain a high temperature, if the temperature of cooling water fulctuates, the degree of concentrativeness and temperature of the plasma arc vary, so that said stationary time $T_1$ is not fixed to some constant, which is found to cause fluctuations in the quality of products.

In the aforementioned Japenese Published Unexamined Utility model application No. SHO-54-152229, the applicant disclosed a welding equipment capable of preventing from welding while the concentration of plasma is insufficient due to rise of cooling water temperature, by starting a plasma arc when the pressure of cooling water becomes higher than 10 kg/cm$^2$.

BRIEF SUMMARY OF THE INVENTION

The object of this invention is to disclose a method and an apparatus capable of keeping constant the time $T_1$ of suspending progress of welding, by detecting the temperature of cooling water at the inlet side of the welding torch and keeping constant the cooling water temperature.

The further object of the invention is to elucidate a method and an apparatus of performing butt welding of tube base metals by plasma keyhole welding, by properly treating the crater at the welding end point with respect to the tube base metals.

DETAILED DESCRIPTION

Figure 1:
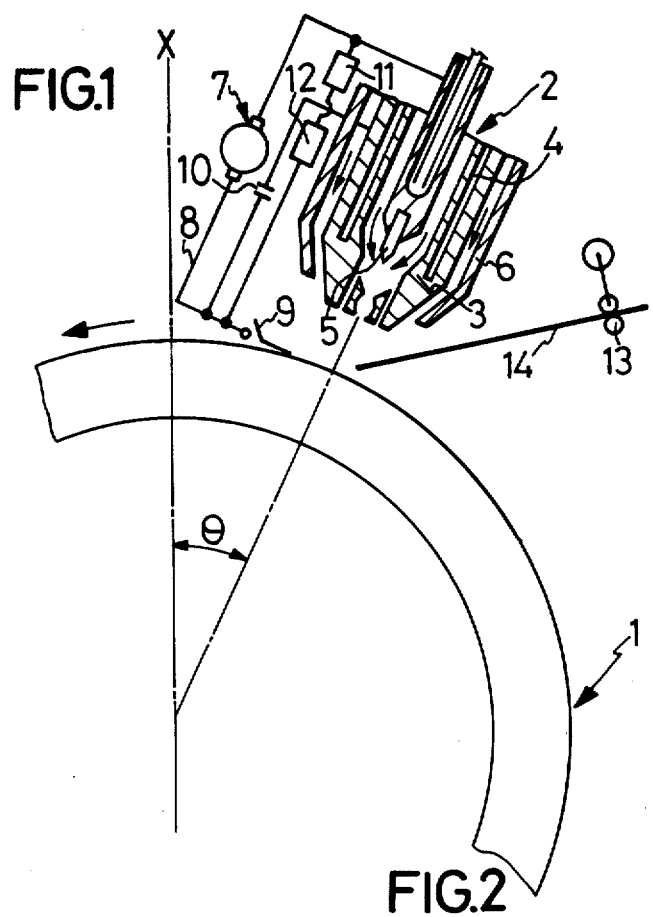
FIG. 1 is an enlarged sectional view of the welding torch.

Referring first to FIG. 1, a conventional plasma welding torch 2 is disposed with in an angle $\theta$ ranging from 10 to 60 degrees, preferably from 20 to 30 degrees, with respect to the vertical line ahead of the rotation of tube base metals 1, with respect to the butt line of the tube base metals 1 placed butt to butt, so as to perform plasma keyhole welding.

The both tube base metals 1 placed butt to butt are rotated simultaneously in the direction of arrow at constant speed by means of a rotating mechanism.

The welding torch 2 has a cooling water jacket 4 formed inside a nozzle 3, and a tungsten electrode 5 is provided in the center of the nozzle hole, while a shielding gas nozzle 6 is installed on the outer circumference of the nozzle 3.

The torch 2 in FIG. 1 is capable of performing plasma keyhole welding, TIG welding, and soft arc welding, and a direct-current power supply 7 designed to apply voltages between the tungsten electrode 5 and tube base metals 1, and between the tungsten electrode 5 and plasma nozzle 3, a remote control 9 to open or close a power supply circuit 8 formed between the direct-current power supply and tube base metals 1, a capacitor 10, a high frequency generator 11, and resistor 12 are connected as in a prior art. In addition, a core wire feed roller 13 is disposed in the vicinity of the torch 2 so that core wire 14 may be fed to the welding part.

Figure 2:
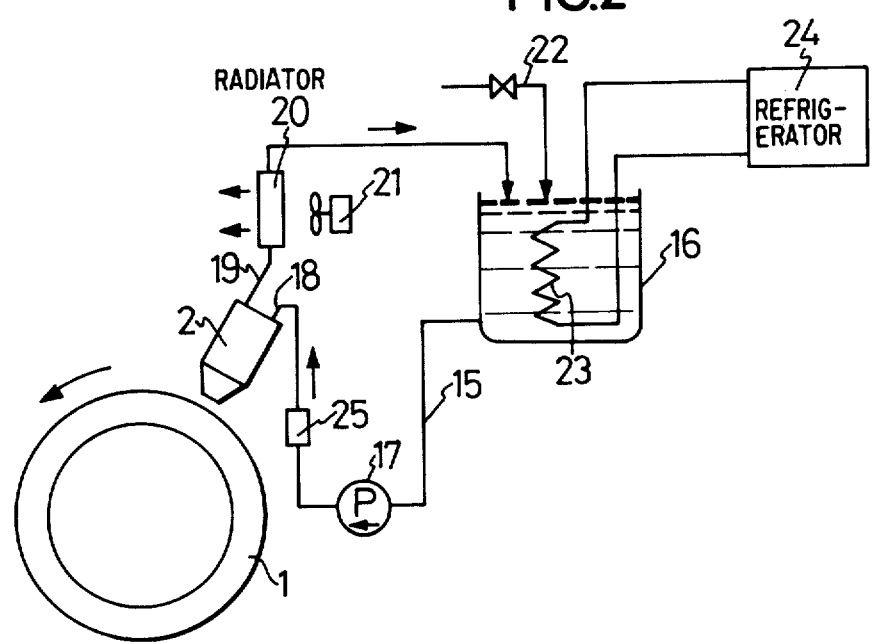
FIG. 2 is an arrangement illustrating the outline of the present invention.

A cooling water circulating passage 15 shown in FIG. 2 is connected to the inlet and outlet of cooling water communicating to the cooling water jacket 4 of the torch 2.

This cooling water circulating passage 15 is intended to pass the cooling water flowing out from a water tank 16 into a cooling water inlet 18 of the torch by means of a pump 17, discharge the water wormed after running through the cooling water jacket 4 in the torch 2 out of an outlet 19, and send the discharged water into a radiator 20 to be cooled by air from a fan 21, and returned to the water tank 16.

The water tank 16 is furnished with a water feed pipe 22 to replenish for the reduced amount of cooling water, and a heat exchanger 23 to pass a refrigerant such as dichlorodifluoromethane. The heat exchanger 23 is connected to a conventional refrigerating machine 24 to pass the refrigerant so as to heat-exchange with the cooling water returning to the water tank 16, thereby cooling to a specified temperature.

A water temperature detector 25 is attached to the inlet 18 of welding torch 2 or to the cooling water circulating passage 15 at the inlet side thereof, and is designed to define the start of plasma arc and the refrigerating machine 24 by detecting the temperature of cooling water being cooled to the specified point.

Described below is the method of performing plasma keyhole welding of the tube base metals 1 by using the aforesaid welding equipment.

Figure 3:
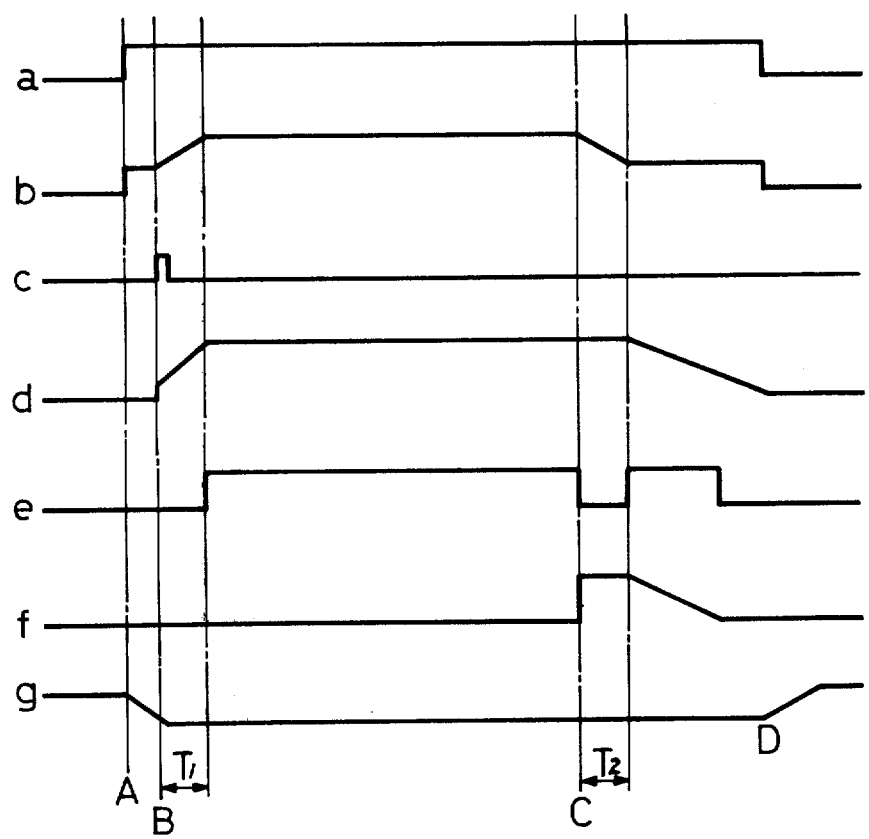
FIG. 3 is a program chart of parts being controlled in embodiment of the invention.

FIG. 3, plotting the passing of the time on the axis of abscissas, shows elements a to g to be controlled during welding. Specifically, a is the flow of shielding gas; b is the flow of center gas; c is a pilot arc; d is a welding current; e is the rotation of base metals, or the welding speed; f is the speed of core wire; and g is the water temperature.

When a weld start switch is closed (point A in FIG. 3), the shielding gas a and center gas b of flow out, and, at the same time, the refrigerating machine 24 starts to cool the water tank 16, thereby lowering the temperature of cooling water to be passed into the welding torch 2 by operation of the pump 17. Since the temperature of the cooling water affects the plasma temperature, the torch inlet temperature should be set to less than 18° C., and the operation should be conducted in the range of $10 \pm 5°$ C., controlling around 15° C. in summer and around 5° C. in winter. If the water temperature exceeds 18° C., the concentration of the plasma becomes insufficient and undulations are formed in the reverse side of the bead, so that the project may be rejected from the inspection standard. The water temperature, therefore, should be controlled very carefully. Or, if the water temperature is below 4° C., the water may be partially frozen and the water flow becomes unstable. The water pressure should be maintained above 10 kg/cm$^2$.

The center gas should start to flow out simultaneously when the switch is turned on, and keep a flow rate of 0.2 liters/minute throughout the welding period.

The shielding gas pressure should maintain 1.5 kg/cm$^2$.

The pressure of the back gas to fill in the tube base metals should be more than 1.5 kg/cm$^2$, taking into consideration the filling speed from the start of injection to completion of filling.

After closing the welding start switch, circulation of cooling water and operation of the refrigerating machine start, and the water temperature is lowered to the specified point (point B in FIG. 3), where the welding current d starts to climb gradually.

The flow of center gas b increases, and when the pilot arc c is fired at the same time, a plasma arc is generated. Since the tube base metals remain stopped, the input heat of the plasma arc is concentrated on the welding start point, and, after certain time $T_1$, the plasma penetrates through the tube base metals to form a keyhole. The keyhole forming time $T_1$ is always constant because the inlet temperature of cooling water is maintained at constant. Suppose the thickness of tube base metals is about 12 mm and the stationary current 160 to 200 A, the duration of $T_1$ is about 3 seconds. Therefore, when the control unit is programed to start keyhole welding in $T_1$ time after receiving a detection signal from the water temperature detector 25, welding may be carried out under optimum conditions, so that the conventional fluctuations of starting welding with the keyhole being incomplete or excessive may be eliminated.

The initial welding current is 30 A.

After lapse of time $T_1$ terminated by the timer from point A of detecting the set water temperature by the water temperature detector 25, both base metals placed butt to butt are rotated synchronously at peripheral speed of 70 to 180 mm/minute. The butt line of the tube base metals is welded as keyhole welding progresses, and when the base metals make a full rotation and the keyhole overlaps with the welding start point (point C in FIG. 3), the process of crater treatment starts.

Then, the rotation of the base metals is stopped for a specified time $T_2$, and the molten pool is enlarged so that the gas in the molten metal may be released easily. If the flow of center gas remains the same at this time, the penetrating power of the plasma arc is exccessive, and melt-down phenomenon may be caused. To avoid this, the flow of center gas is reduced. In this stage, however, since the viscosity of the molten pool drops to cause melt-down possibly, the core wire 14 is fed in this part. If the duration of time $T_2$ in this stage is too long, the subsequent grinder treatment of the head becomes difficult, but if it is too short, gas is not completely relesed so that a blowhole may be caused. Accordingly, the duration of $T_2$ should be about 1 to 3 seconds. After lapse of $T_2$, the base metals are put into rotation again, and the welding current d, core wire feed speed f and center gas flow b are gradually lowered, and the welding is completed at point D in FIG. 3. At this moment, the plasma is no longer a strong arc to produce a keyhole, but it is a soft arc similar to an ordinary TIG arc.

This invention may be applied not only in tube materials, but also plate materials. In the present invention, since the cooling water temperature at the inlet of the welding torch is detected by the water temperature detector 25 and the plasma arc is started at a set temperature of higher than 4° C. and lower than 18° C., only by interrupting the progress of welding for a specified duration of time $T_1$, a molten pool of the optimum state may be always formed, and high-quality welding free from blowhole may be realized in plasma keyhole welding by means of an automatic equipment, which is extremely useful industrially.

What is claimed is:

1. Method for plasma welding comprising the steps of forming a keyhole in the base metals being welded by a plasma arc produced from a plasma welding torch wherein the temperature of the cooling water to be passed into the plasma welding torch at the inlet side of the cooling system is controlled at a set temperature of more than 4° C. and less than 18° C., starting the plasma arc when the cooling temperature reaches the set temperature, and starting the relative movement of the base metals and torch upon lapse of a specified time to form a keyhole after starting the plasma arc.

2. A method of welding as defind in claim 1 wherein water temperature is controlled within the range of $10° \pm 5°$ C.

3. Method for plasma welding of tubes while forming a keyhole in the base metals by a plasma arc, produced from a plasma welding torch consisting essentially of starting a plasma arc by locating the plasma welding torch at a position from 10 to 60 degrees with respect to a line which is vertical relative to earth, filling the back side of the tube base metals with back gas at a pressure of more than 1.5 kg/cm², letting in a shielding gas from the plasma welding torch at a pressure of more than 1.5 kg/cm², cooling the plasma torch with cooling water and controlling the inlet temperature of said cooling water within a range of 4°–18° C.; forming a keyhole in the tube base metals while continuing the plasma arc with the tube base metals being stopped, proceeding plasma keyhole welding circulating around the tube base metals by rotating the tube base metals at a specified speed in a set time after start of the plasma arc, reducing the flow of center gas gradually by stopping the rotation of the tube base metals when the welding circles around the tube base metals and returns to the welding start point and at the same time feeding core wire, and resuming constant-speed rotation of the tube base metals a set time after stopping of the tube base metals and also to provide a soft arc gradually decreasing the welding current and core wire feed speed.

4. A method welding as defined in claim 1 wherein water temperature is controlled within the range of 10°±5° C.

* * * * *